(12) United States Patent
Yoshida et al.

(10) Patent No.: US 12,065,119 B2
(45) Date of Patent: Aug. 20, 2024

(54) BRAKE HYDRAULIC PRESSURE CONTROL APPARATUS

(71) Applicant: Robert Bosch GmbH, Stuttgart (DE)

(72) Inventors: Atsushi Yoshida, Kanagawa (JP); Katsunori Koike, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 633 days.

(21) Appl. No.: 17/275,957

(22) PCT Filed: Aug. 23, 2019

(86) PCT No.: PCT/IB2019/057104
§ 371 (c)(1),
(2) Date: Mar. 12, 2021

(87) PCT Pub. No.: WO2020/058787
PCT Pub. Date: Mar. 26, 2020

(65) Prior Publication Data
US 2022/0055584 A1 Feb. 24, 2022

(30) Foreign Application Priority Data
Sep. 19, 2018 (JP) .................................. 2018-174331

(51) Int. Cl.
*B60T 8/36* (2006.01)
*B60T 8/40* (2006.01)
(Continued)

(52) U.S. Cl.
CPC ............ *B60T 8/368* (2013.01); *B60T 8/4022* (2013.01); *B60T 13/686* (2013.01); *B60T 8/3225* (2013.01)

(58) Field of Classification Search
CPC .................................................. B60T 8/4022
See application file for complete search history.

(56) References Cited

U.S. PATENT DOCUMENTS

| 2002/0117914 A1 | 8/2002 | Doi et al. |
| 2017/0248445 A1 | 8/2017 | Ausserlechner |
| 2018/0009425 A1* | 1/2018 | Feigel .................. B60T 13/145 |

FOREIGN PATENT DOCUMENTS

| DE | 4231784 A1 * | 3/1994 | ......... B60G 17/0152 |
| DE | 102014214095 A1 * | 1/2016 | ............. B60T 13/74 |

(Continued)

OTHER PUBLICATIONS

International Search Report and Written Opinion for Application No. PCT/IB2019/057104 dated Dec. 19, 2019 (8 pages).

*Primary Examiner* — Melody M Burch
(74) *Attorney, Agent, or Firm* — Michael Best & Friedrich LLP

(57) ABSTRACT

Examples herein include a brake hydraulic pressure control apparatus including a base body formed with a channel of a brake fluid, a motor assembly having a rotor and a stator accommodated in a motor housing, and a control board of a controller that controls the motor assembly. The control board is arranged on a rotation axis of the rotor. A permanent magnet is attached to the motor assembly and rotates with the rotor, and a coil is wound around the stator. A feeding terminal is connected to the coil and the control board, and is used when being supplied with electric power from the control board. A positioning mechanism extends between and contacts the motor assembly and the control board to position the motor assembly and the control board. A detection sensor is mounted on the control board and detects a magnetic field generated by the permanent magnet.

8 Claims, 9 Drawing Sheets

(51) Int. Cl.
    *B60T 13/68*     (2006.01)
    *B60T 8/32*     (2006.01)

(56) References Cited

FOREIGN PATENT DOCUMENTS

| | | | | |
|---|---|---|---|---|
| EP | 2432103 A2 | 3/2012 | | |
| JP | 2014015077 A | 1/2014 | | |
| JP | 2018008673 A | 1/2018 | | |
| JP | 2018125948 A * | 8/2018 | | |
| WO | WO-0051863 A1 * | 9/2000 | ............. | B60T 8/368 |
| WO | 2009125527 A1 | 10/2009 | | |
| WO | WO-2011089150 A2 * | 7/2011 | ............ | B60T 8/3675 |

* cited by examiner

[FIG. 1]
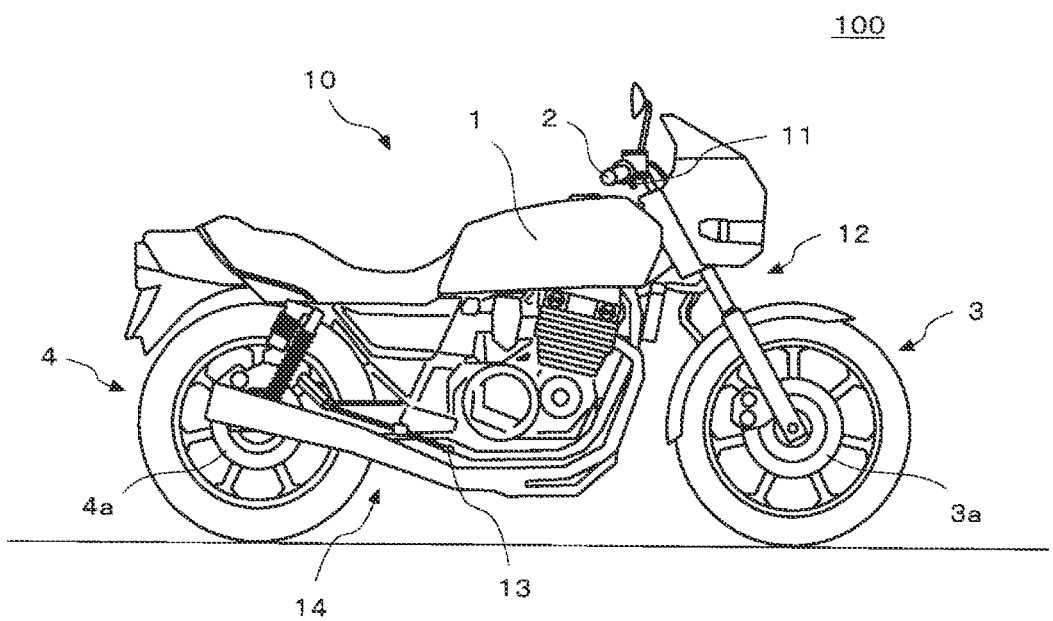

[FIG. 2]
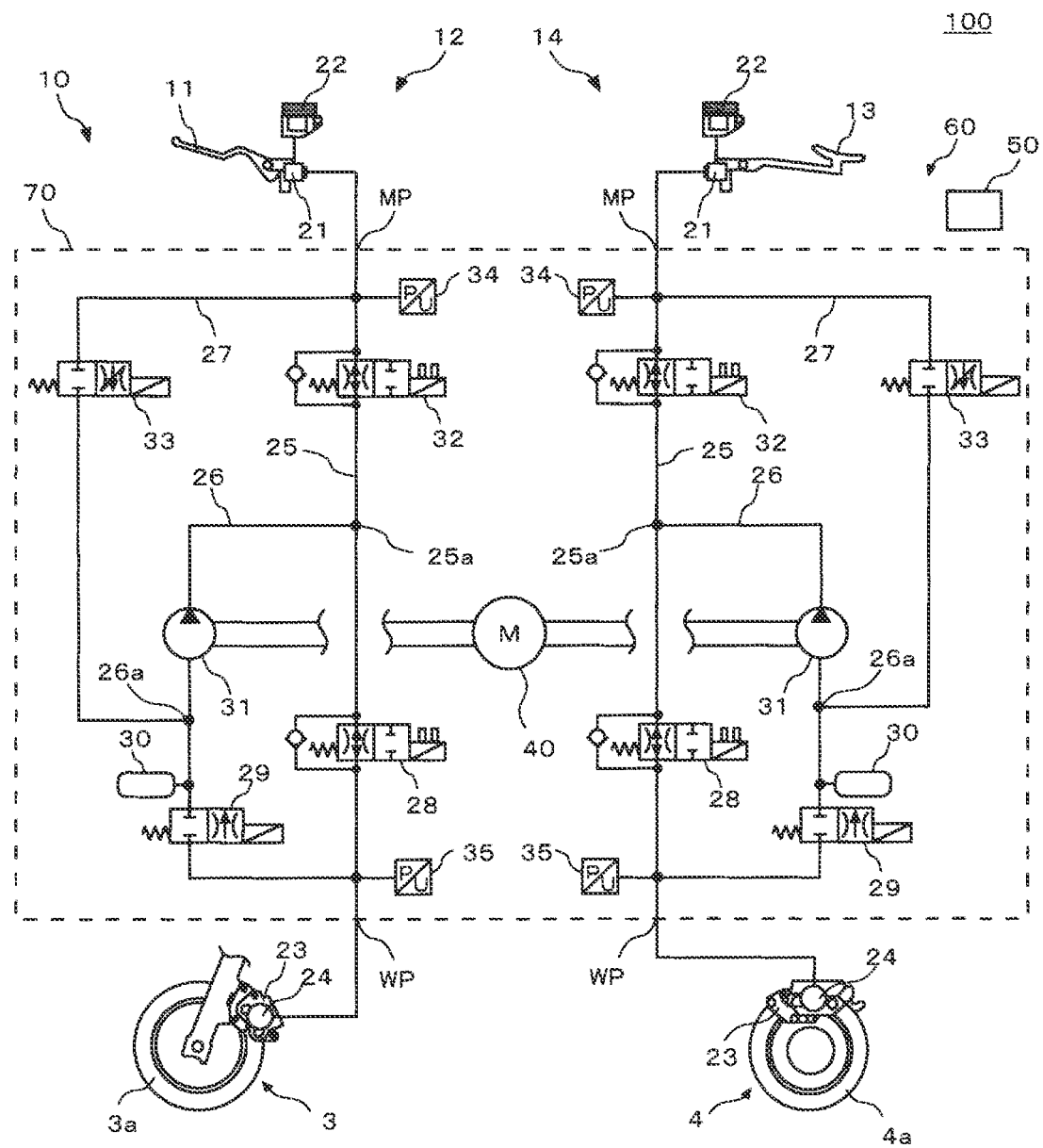

[FIG. 3]
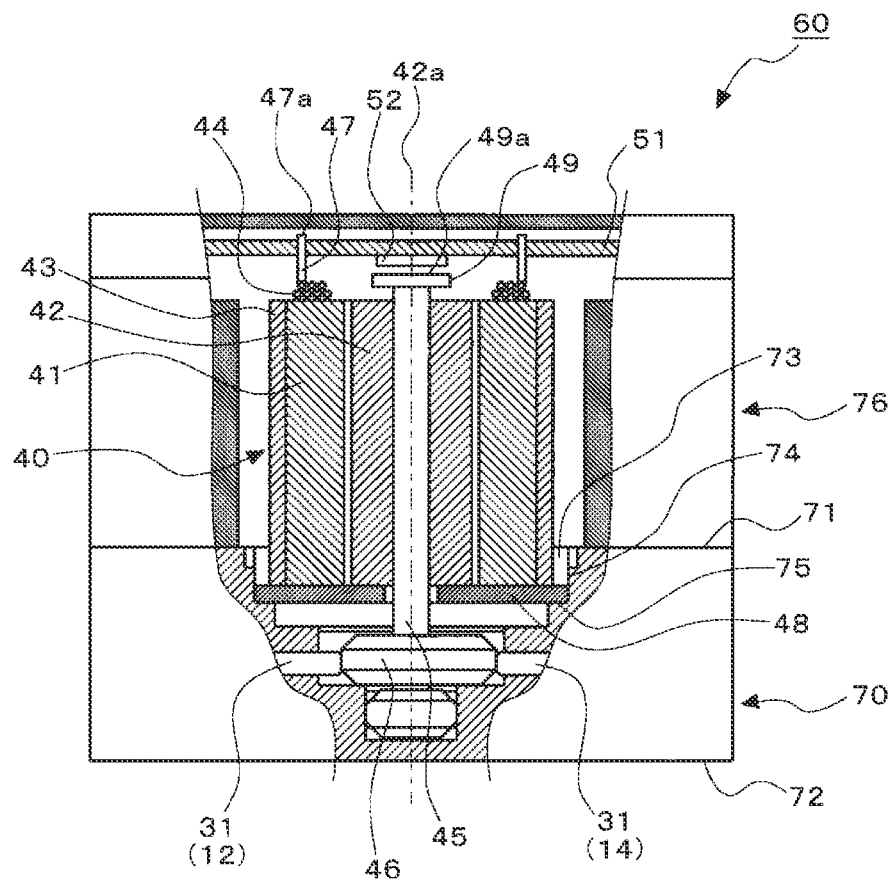

[FIG. 4]
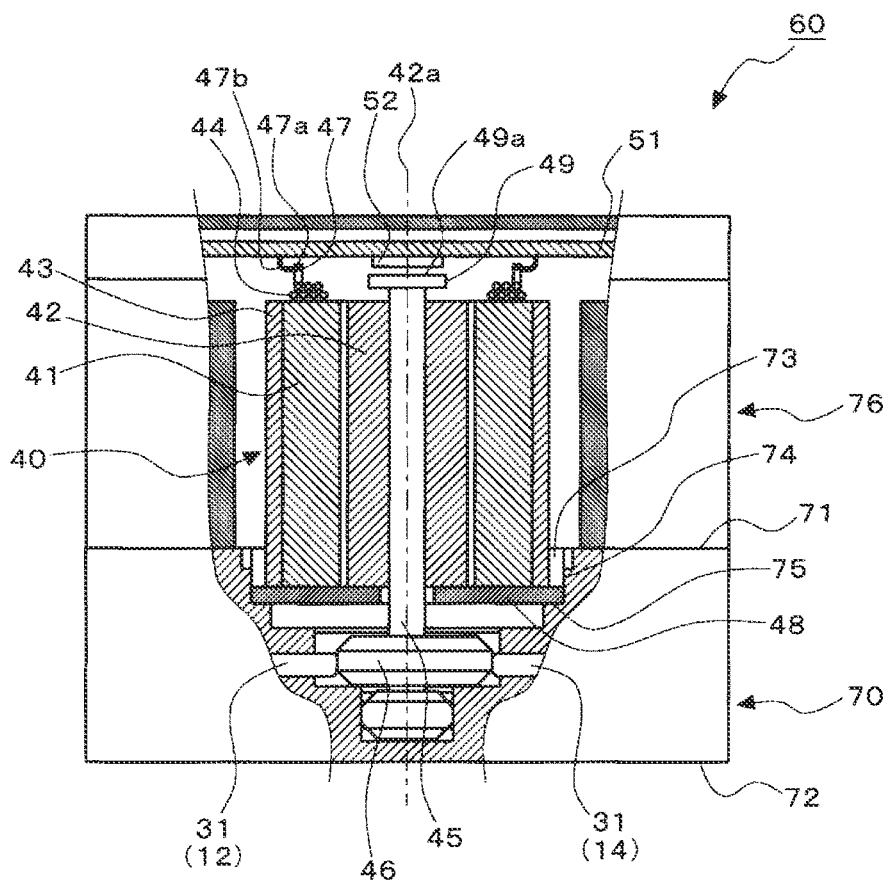

[FIG. 5]
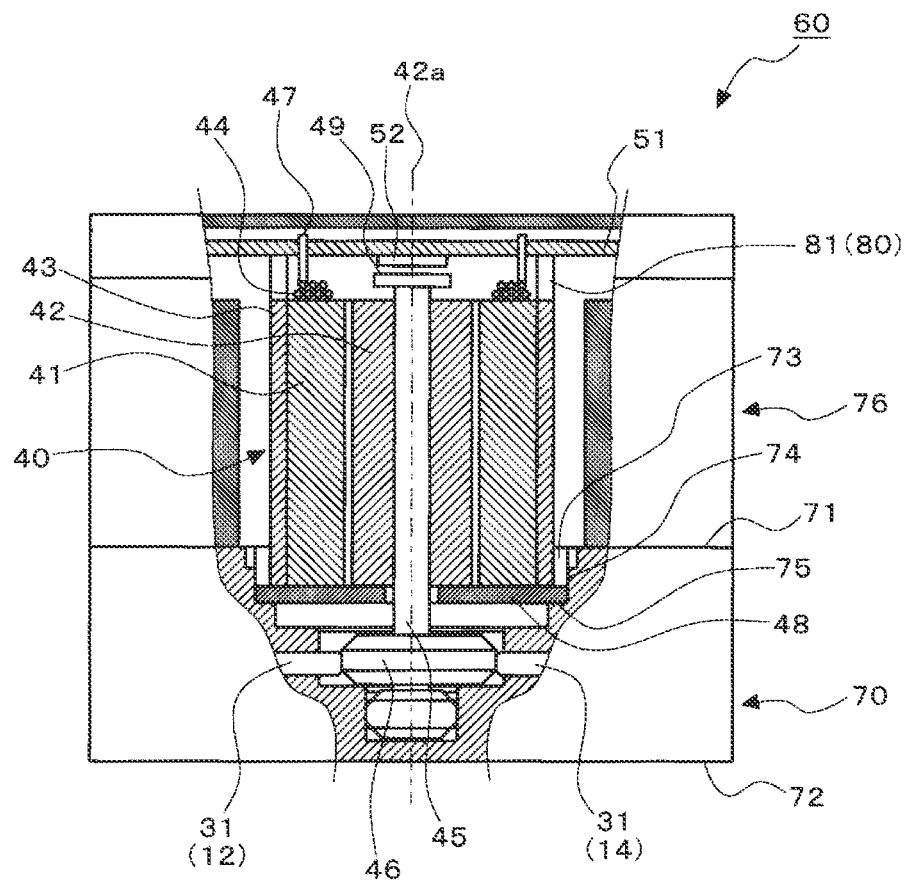

[FIG. 6]
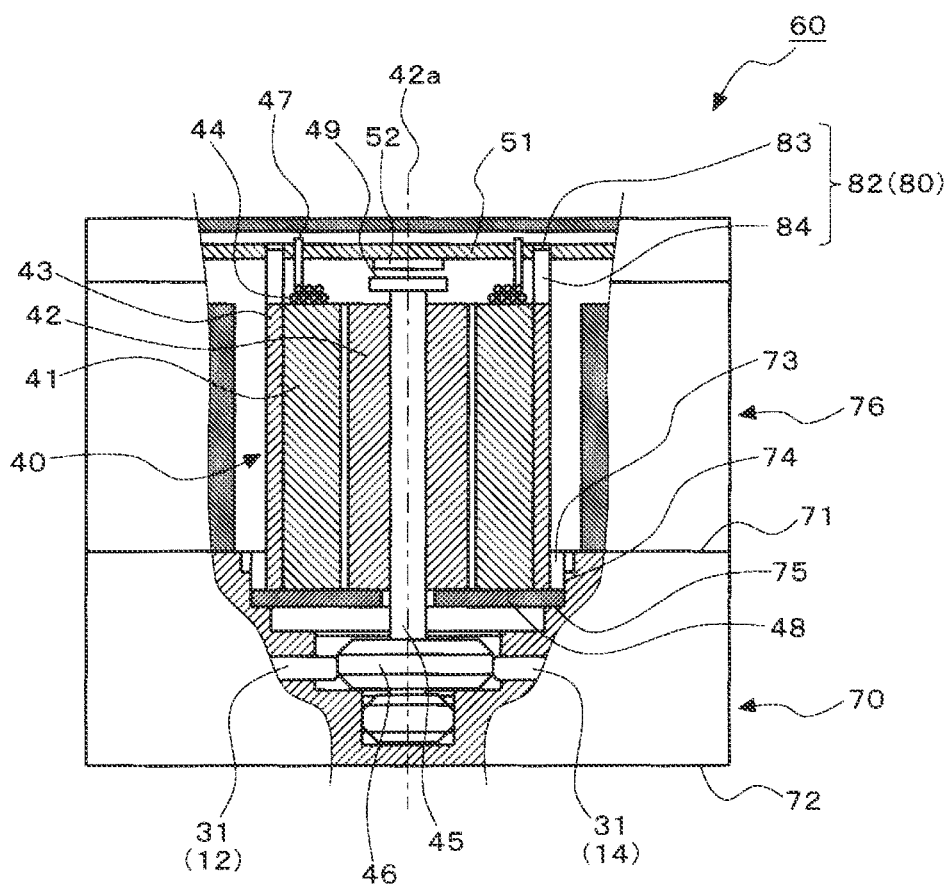

[FIG. 7]
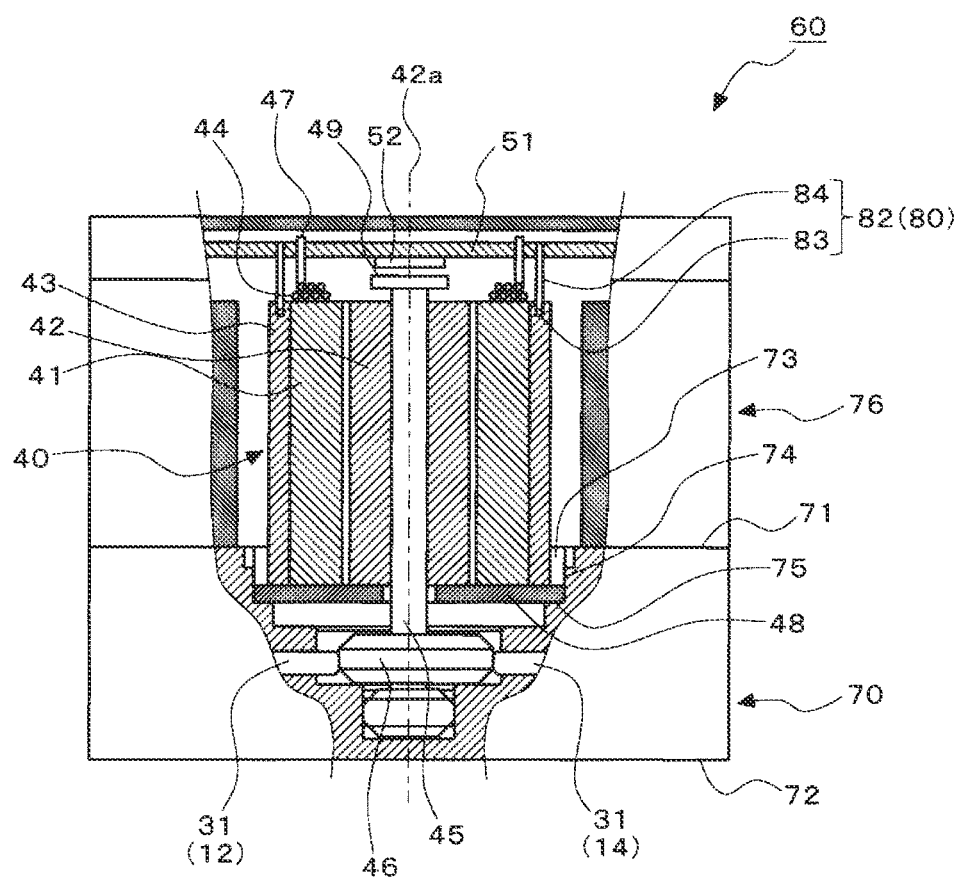

[FIG. 8]
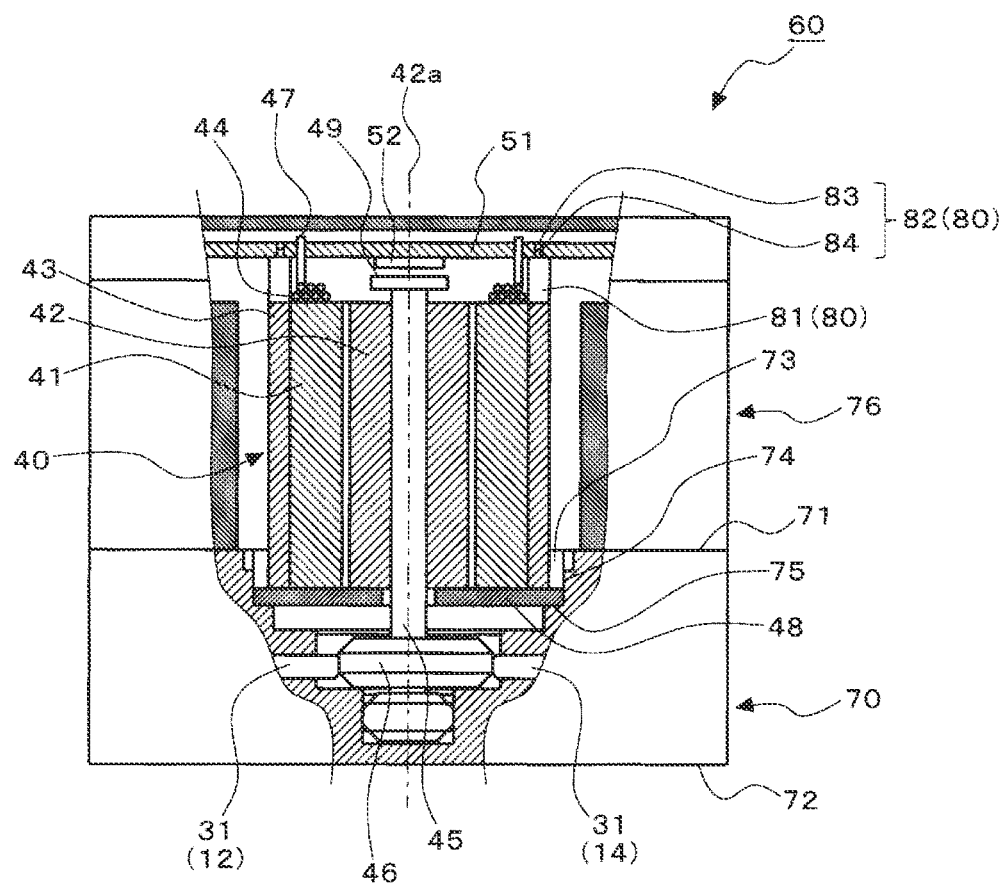

[FIG. 9]
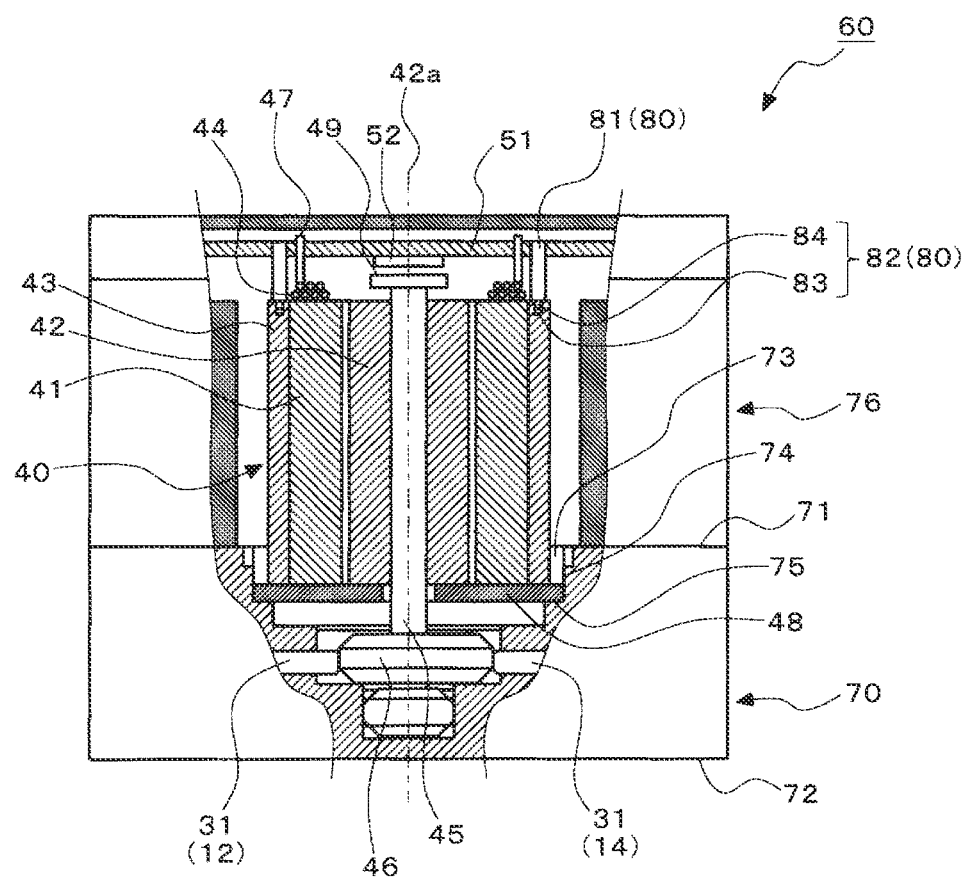

BRAKE HYDRAULIC PRESSURE CONTROL APPARATUS

BACKGROUND OF THE INVENTION

The present invention relates to a brake hydraulic pressure control apparatus for a vehicle.

A brake hydraulic pressure control apparatus for anti-lock braking operation of a vehicle brake system has been known. In a state where an occupant of a vehicle operates an input section such as a brake lever, this brake hydraulic pressure control apparatus regulates a braking force generated on a wheel by increasing or reducing a pressure of a brake fluid in a brake fluid circuit. Among such brake hydraulic pressure control apparatuses, there is a brake hydraulic pressure control apparatus in which a channel constituting a part of the brake fluid circuit, a pump device increasing the pressure of the brake fluid in the brake fluid circuit, a control unit controlling the pump device, and the like are unitized (for example, see JP-A-2014-015077).

More specifically, the unitized brake hydraulic pressure control apparatus includes: a base body formed with the channel of the brake fluid; a motor driving the pump device provided in the channel of the brake fluid; a control board of a controller controlling the motor; and a housing accommodating a control board. The base body of the brake hydraulic pressure control apparatus has a substantially rectangular-parallelepiped shape, and the housing is attached to one surface thereof. Here, the surface of the base body, to which the housing is attached, will be referred to as a first surface. An opposite surface from the first surface of the base body will be referred to as a second surface. When the first surface and the second surface are defined just as described, in the conventional brake hydraulic pressure control apparatus, the motor for driving the pump device is attached to the second surface of the base body.

SUMMARY OF THE INVENTION

Conventionally, in order to detect a rotation angle of a rotor in the motor, in other words, in order to detect a rotation angle of an output shaft attached to the rotor, there is a case where a permanent magnet and a detection sensor detecting a magnetic field generated by the permanent magnet are used. The permanent magnet is attached to a rotating portion of the motor and rotates with the rotor. The detection sensor is arranged at a position opposing the permanent magnet. Since the permanent magnet and the detection sensor are provided just as described, it is possible to detect the rotation angle of the rotor on the basis of a change in the magnetic field detected by the detection sensor.

In the above-described unitized conventional brake hydraulic pressure control apparatus, in the case where the permanent magnet and the detection sensor are used to detect the rotation angle of the rotor, the permanent magnet and the detection sensor are arranged as follows. As described above, the motor in the unitized conventional brake hydraulic pressure control apparatus is attached to the second surface of the base body. That is, the motor is arranged on the opposite side from the housing, in which the control board is accommodated, with the base body being a reference. Thus, the permanent magnet, which is attached to the rotating portion of the motor, is also arranged on the opposite side from the housing, in which the control board is accommodated, with the base body being the reference. Furthermore, the detection sensor, which is arranged at the position opposing the permanent magnet, is also arranged on the opposite side from the housing, in which the control board is accommodated, with the base body being the reference.

That is, the detection sensor is arranged on an opposite side from the control board, which is accommodated in the housing, with the base body being the reference. Thus, the detection sensor is mounted on a different control board from the control board accommodated in the housing. As a result, in the unitized conventional brake hydraulic pressure control apparatus, in the case where the permanent magnet and the detection sensor are used to detect the rotation angle of the rotor, the new control board, on which the detection sensor is mounted, is required. Therefore, there is a problem of increased manufacturing cost of the brake hydraulic pressure control apparatus.

The present invention has been made in view of the above-described problem, and therefore has a purpose of obtaining a brake hydraulic pressure control apparatus for a vehicle capable of suppressing an increase in manufacturing cost thereof when being configured to detect a rotation angle of a rotor.

A brake hydraulic pressure control apparatus according to the present invention is a brake hydraulic pressure control apparatus for a vehicle that includes: a base body that is formed with a channel of a brake fluid; a motor assembly that includes a rotor and a stator and drives a pump device provided in the channel; a control board of a controller that controls the motor assembly; and a housing that accommodates the control board, and that further includes: a permanent magnet that is attached to the motor assembly and rotates with the rotor; and a detection sensor that detects a magnetic field generated by the permanent magnet. The motor assembly is arranged in a space that is surrounded by the base body and the housing, the control board is arranged in a rotation axis direction of the rotor in a manner to oppose the permanent magnet, and the detection sensor is mounted on the control board.

In the brake hydraulic pressure control apparatus according to the present invention, the motor assembly is arranged in the space that is surrounded by the base body and the housing. In addition, in the brake hydraulic pressure control apparatus according to the present invention, the control board of the controller, which controls the motor assembly, is arranged in the rotation axis direction of the rotor in a manner to oppose the permanent magnet. Thus, in the brake hydraulic pressure control apparatus according to the present invention, the detection sensor can be mounted on the control board that is conventionally provided. Therefore, even in the case where the brake hydraulic pressure control apparatus according to the present invention is configured to detect the rotation angle of the rotor, it is possible to suppress an increase in manufacturing cost in comparison with a conventional brake hydraulic pressure control apparatus.

BRIEF DESCRIPTION OF DRAWINGS

FIG. 1 is a configuration diagram of a vehicle on which a brake system according to a first embodiment of the present invention is mounted.

FIG. 2 is a configuration diagram of the brake system according to the first embodiment of the present invention.

FIG. 3 is a partial cross-sectional view in which a unitized portion of a brake hydraulic pressure control apparatus according to the first embodiment of the present invention is viewed from a side.

FIG. 4 is a partial cross-sectional view in which another example of the unitized portion of the brake hydraulic pressure control apparatus according to the first embodiment of the present invention is viewed from the side.

FIG. 5 is a partial cross-sectional view in which a unitized portion of a brake hydraulic pressure control apparatus according to a second embodiment of the present invention is viewed from the side.

FIG. 6 is a partial cross-sectional view in which a unitized portion of a brake hydraulic pressure control apparatus according to a third embodiment of the present invention is viewed from the side.

FIG. 7 is a partial cross-sectional view in which another example of the unitized portion of the brake hydraulic pressure control apparatus according to the third embodiment of the present invention is viewed from the side.

FIG. 8 is a partial cross-sectional view in which an example of a unitized portion of a brake hydraulic pressure control apparatus according to a fourth embodiment of the present invention is viewed from the side.

FIG. 9 is a partial cross-sectional view in which another example of the unitized portion of the brake hydraulic pressure control apparatus according to the fourth embodiment of the present invention is viewed from the side.

DETAILED DESCRIPTION

A description will hereinafter be made on a brake hydraulic pressure control apparatus for a vehicle according to the present invention with reference to the drawings.

Note that a description will hereinafter be made on a case where the brake hydraulic pressure control apparatus according to the present invention is adopted for a two-wheeled motor vehicle; however, the brake hydraulic pressure control apparatus according to the present invention may be adopted for a vehicle other than the two-wheeled motor vehicle. For example, the vehicle other than the two-wheeled motor vehicle includes a pedal-driven vehicle, a three-wheeled motor vehicle, a four-wheeled motor vehicle, and the like, each of which has at least one of an engine and an electric motor as a drive source. The pedal-driven vehicle means a vehicle in general that can travel forward on a road by a depressing force applied to pedals. That is, the pedal-driven vehicle includes a normal pedal-driven vehicle, an electrically-assisted pedal-driven vehicle, an electric pedal-driven vehicle, and the like. Meanwhile, the two-wheeled motor vehicle and the three-wheeled motor vehicle each mean a so-called motorcycle, and the motorcycle includes a bike, a scooter, an electric scooter, and the like. Furthermore, a description will hereinafter be made on a case where the brake hydraulic pressure control apparatus includes two systems of hydraulic circuits. However, the number of the hydraulic circuit in the brake hydraulic pressure control apparatus is not limited to two systems. The brake hydraulic pressure control apparatus may include only one system of the hydraulic circuit, or may include three or more systems of the hydraulic circuits.

A configuration, operation, and the like, which will be described below, constitute merely one example, and the brake hydraulic pressure control apparatus according to the present invention is not limited to a case with such a configuration, such operation, and the like. In the drawings, the same or similar members or portions will be denoted by the same reference sign or will not be denoted by a reference sign. A detailed structure will appropriately be illustrated in a simplified manner or will not be illustrated.

First Embodiment

A description will hereinafter be made on a brake system for a vehicle that includes a brake hydraulic pressure control apparatus according to this first embodiment.

<Configuration and Operation of Vehicle Brake System>

A description will be made on a configuration and operation of the brake system according to this first embodiment.

FIG. 1 is a configuration diagram of the vehicle on which the brake system according to the first embodiment of the present invention is mounted. FIG. 2 is a configuration diagram of the brake system according to the first embodiment of the present invention.

As illustrated in FIG. 1 and FIG. 2, a brake system 10 is mounted on a vehicle 100 as a two-wheeled motor vehicle, for example. The vehicle 100 includes: a trunk 1; a handlebar 2 that is held by the trunk 1 in a freely turnable manner; a front wheel 3 that is held by the trunk 1 in a freely turnable manner with the handlebar 2; and a rear wheel 4 that is held by the trunk 1 in a freely rotatable manner.

The brake system 10 includes: a brake lever 11; a first hydraulic circuit 12 that is filled with a brake fluid; a brake pedal 13; and a second hydraulic circuit 14 that is filled with the brake fluid. The brake lever 11 is provided on the handlebar 2 and is operated by a user's hand. The first hydraulic circuit 12 causes a rotor 3a that rotates with the front wheel 3 to generate a braking force corresponding to an operation amount of the brake lever 11. The brake pedal 13 is provided in a lower portion of the trunk 1 and is operated by the user's foot. The second hydraulic circuit 14 causes a rotor 4a that rotates with the rear wheel 4 to generate the braking force corresponding to an operation amount of the brake pedal 13.

The brake lever 11 and the brake pedal 13 are examples of a brake input section. For example, as the brake input section replacing the brake lever 11, a different brake pedal from the brake pedal 13 provided in the trunk 1 may be adopted. In addition, for example, as the brake input section replacing the brake pedal 13, a different brake lever from the brake lever 11 provided on the handlebar 2 may be adopted. The first hydraulic circuit 12 may cause the rotor 4a, which rotates with the rear wheel 4, to generate the braking force corresponding to the operation amount of the brake lever 11 or an operation amount of the different brake pedal from the brake pedal 13 provided in the trunk 1. In addition, the second hydraulic circuit 14 may cause the rotor 3a, which rotates with the front wheel 3, to generate the braking force corresponding to the operation amount of the brake pedal 13 or an operation amount of the different brake lever from the brake lever 11 provided on the handlebar 2.

The first hydraulic circuit 12 and the second hydraulic circuit 14 have the same configuration. A description will hereinafter be made on a configuration of the first hydraulic circuit 12 as a representative example.

The first hydraulic circuit 12 includes: a master cylinder 21 that includes a piston (not illustrated) therein; a reservoir 22 that is attached to the master cylinder 21; a brake caliper 23 that is held by the trunk 1 and has a brake pad (not illustrated); and a wheel cylinder 24 that operates the brake pad (not illustrated) of the brake caliper 23.

In the first hydraulic circuit 12, the master cylinder 21 and the wheel cylinder 24 communicate with each other via a fluid pipe connected between the master cylinder 21 and a master cylinder port MP formed in a base body 70, a primary channel 25 formed in the base body 70, and a fluid pipe connected between the wheel cylinder 24 and a wheel cylinder port WP formed in the base body 70. The base body 70 is also formed with a secondary channel 26. The brake fluid in the wheel cylinder 24 is released to a primary channel intermediate portion 25a, which is an intermediate portion of the primary channel 25, via the secondary channel 26. The base body 70 is further formed with a booster channel 27. The brake fluid in the master cylinder 21 is supplied to a secondary channel intermediate portion 26a, which is an intermediate portion of the secondary channel 26, via the booster channel 27.

In a region on the wheel cylinder 24 side from the primary channel intermediate portion 25a in the primary channel 25, an inlet valve 28 is provided. A flow rate of the brake fluid flowing through this region is controlled by opening/closing operation of the inlet valve 28. In a region on an upstream side of the secondary channel intermediate portion 26a in the secondary channel 26, an outlet valve 29 and an accumulator 30 for storing the brake fluid are sequentially provided from the upstream side. A flow rate of the brake fluid flowing through this region is controlled by opening/closing operation of the outlet valve 29. In a region on a downstream side of the secondary channel intermediate portion 26a in the secondary channel 26, a pump device 31 is provided. In a region on the master cylinder 21 side from the primary channel intermediate portion 25a in the primary channel 25, a switching valve 32 is provided. A flow rate of the brake fluid flowing through this region is controlled by opening/closing operation of the switching valve 32. A booster valve 33 is provided in the booster channel 27. A flow rate of the brake fluid flowing through the booster channel 27 is controlled by opening/closing operation of the booster valve 33.

In a region on the master cylinder 21 side from the switching valve 32 in the primary channel 25, a master cylinder hydraulic pressure sensor 34 is provided to detect a hydraulic pressure of the brake fluid in the master cylinder 21. In a region on the wheel cylinder 24 side from the inlet valve 28 in the primary channel 25, a wheel cylinder hydraulic pressure sensor 35 is provided to detect a hydraulic pressure of the brake fluid in the wheel cylinder 24.

That is, the primary channel 25 communicates between the master cylinder port MP and the wheel cylinder port WP via the inlet valve 28. The secondary channel 26 is a channel that is defined as a part or all of a channel from which the brake fluid in the wheel cylinder 24 is released to the master cylinder 21 via the outlet valve 29. The booster channel 27 is a channel that is defined as a part or all of a channel through which the brake fluid in the master cylinder 21 is supplied to a portion of the secondary channel 26 on an upstream side of the pump device 31 via the booster valve 33.

The inlet valve 28 is an electromagnetic valve that is switched from being opened to being closed and thereby blocks the flow of the brake fluid at a mounted position when being brought from an unenergized state to an energized state, for example. The outlet valve 29 is an electromagnetic valve that is switched from being closed to being opened and thereby allows the flow of the brake fluid toward the secondary channel intermediate portion 26a via a mounted position when being brought from the unenergized state to the energized state, for example. The switching valve 32 is an electromagnetic valve that is switched from being opened to being closed and thereby blocks the flow of the brake fluid at a mounted position when being brought from an unenergized state to an energized state, for example. The booster valve 33 is an electromagnetic valve that is switched from being closed to being opened and thereby allows the flow of the brake fluid toward the secondary channel intermediate portion 26a via a mounted position when being brought from the unenergized state to the energized state, for example.

The pump device 31 in the first hydraulic circuit 12 and the pump device 31 in the second hydraulic circuit 14 are driven by a common motor assembly 40.

A brake hydraulic pressure control apparatus 60 is configured to include: the base body 70; members (the inlet valves 28, the outlet valves 29, the accumulators 30, the pump devices 31, the switching valves 32, the booster valves 33, the master cylinder hydraulic pressure sensors 34, the wheel cylinder hydraulic pressure sensors 35, the motor assembly 40, and the like) provided in the base body 70; and a controller (ECU) 50.

The controller 50 may be provided as a single unit or may be divided into plural units. The controller 50 may be attached to the base body 70 or may be attached to a member other than the base body 70. The controller 50 may partially or entirely be constructed of a microcomputer, a microprocessor unit, or the like, may be constructed of a member in which firmware or the like can be updated, or may be a program module or the like that is executed by a command from a CPU or the like, for example. As will be described later, in the brake hydraulic pressure control apparatus 60 according to this first embodiment, at least a part of the controller 50 is constructed of a control board 51.

For example, in a normal state, the controller 50 controls the inlet valve 28, the outlet valve 29, the switching valve 32, and the booster valve 33 in the unenergized state. When the brake lever 11 is operated in such a state, in the first hydraulic circuit 12, the piston (not illustrated) in the master cylinder 21 is pressed to increase the hydraulic pressure of the brake fluid in the wheel cylinder 24, the brake pad (not illustrated) of the brake caliper 23 is pressed against the rotor 3a of the front wheel 3, and the front wheel 3 is thereby braked. Meanwhile, when the brake pedal 13 is operated, in the second hydraulic circuit 14, the piston (not illustrated) in the master cylinder 21 is pressed to increase the hydraulic pressure of the brake fluid in the wheel cylinder 24, the brake pad (not illustrated) of the brake caliper 23 is pressed against the rotor 4a of the rear wheel 4, and the rear wheel 4 is thereby braked.

The controller 50 receives output of each of the sensors (the master cylinder hydraulic pressure sensor 34, the wheel cylinder hydraulic pressure sensor 35, a wheel speed sensor, an acceleration sensor, and the like). According to such output, the controller 50 outputs a command that governs operation of the motor assembly 40, each of the valves, and the like, so as to perform pressure reducing control operation, pressure increasing control operation, or the like.

For example, in the case where the hydraulic pressure of the brake fluid in the wheel cylinder 24 of the first hydraulic circuit 12 is excessive or is possibly excessive, the controller 50 performs the operation to reduce the hydraulic pressure of the brake fluid in the wheel cylinder 24 of the first hydraulic circuit 12. At the time, the controller 50 drives the motor assembly 40 while controlling the inlet valve 28 in the energized state, controlling the outlet valve 29 in the energized state, controlling the switching valve 32 in the unenergized state, and controlling the booster valve 33 in the unenergized state in the first hydraulic circuit 12. Meanwhile, in the case where the hydraulic pressure of the brake fluid in the wheel cylinder 24 of the second hydraulic circuit 14 is excessive or is possibly excessive, the controller 50 performs the operation to reduce the hydraulic pressure of the brake fluid in the wheel cylinder 24 of the second hydraulic circuit 14. At the time, the controller 50 drives the motor assembly 40 while controlling the inlet valve 28 in the energized state, controlling the outlet valve 29 in the energized state, controlling the switching valve 32 in the unenergized state, and controlling the booster valve 33 in the unenergized state in the second hydraulic circuit 14.

In addition, for example, in the case where the hydraulic pressure of the brake fluid in the wheel cylinder 24 of the first hydraulic circuit 12 is short or is possibly short, the controller 50 performs the operation to increase the hydraulic pressure of the brake fluid in the wheel cylinder 24 of the first hydraulic circuit 12. At the time, the controller 50 drives the motor assembly 40 while controlling the inlet valve 28 in the unenergized state, controlling the outlet valve 29 in the unenergized state, controlling the switching valve 32 in the energized state, and controlling the booster valve 33 in the energized state in the first hydraulic circuit 12. Meanwhile, in the case where the hydraulic pressure of the brake fluid in the wheel cylinder 24 of the second hydraulic circuit 14 is short or is possibly short, the controller 50 performs the operation to increase the hydraulic pressure of the brake fluid in the wheel cylinder 24 of the second hydraulic circuit 14. At the time, the controller 50 drives the motor assembly 40 while controlling the inlet valve 28 in the unenergized state, controlling the outlet valve 29 in the unenergized state, controlling the switching valve 32 in the energized state, and controlling the booster valve 33 in the energized state in the second hydraulic circuit 14.

That is, the brake hydraulic pressure control apparatus 60 can perform anti-lock braking operation of the first hydraulic circuit 12 by controlling the hydraulic pressure of the brake fluid in the wheel cylinder 24 of the first hydraulic circuit 12. In addition, the brake hydraulic pressure control apparatus 60 can perform anti-lock braking operation of the second hydraulic circuit 14 by controlling the hydraulic pressure of the brake fluid in the wheel cylinder 24 of the second hydraulic circuit 14. Furthermore, the brake hydraulic pressure control apparatus 60 can perform automatic pressure increasing operation of the first hydraulic circuit 12 by controlling the hydraulic pressure of the brake fluid in the wheel cylinder 24 of the first hydraulic circuit 12. Moreover, the brake hydraulic pressure control apparatus 60 can perform automatic pressure increasing operation of the second hydraulic circuit 14 by controlling the hydraulic pressure of the brake fluid in the wheel cylinder 24 of the second hydraulic circuit 14.

<Configuration of Brake Hydraulic Pressure Control Apparatus>

In the brake hydraulic pressure control apparatus 60, the base body 70, the motor assembly 40, and the control board 51 of the controller 50 are unitized. In this first embodiment, the members (the inlet valves 28, the outlet valves 29, the accumulators 30, the pump devices 31, the switching valves 32, the booster valves 33, the master cylinder hydraulic pressure sensors 34, the wheel cylinder hydraulic pressure sensors 35, and the like) other than the motor assembly 40 provided in the base body 70 are also unitized with the base body 70 and the control board 51. A description will hereinafter be made on a configuration of the unitized portion of the brake hydraulic pressure control apparatus 60.

FIG. 3 is a partial cross-sectional view in which a unitized portion of the brake hydraulic pressure control apparatus according to the first embodiment of the present invention is viewed from a side.

The above-described base body 70 is formed of metal such as aluminum, and has a substantially rectangular-parallelepiped shape, for example. This base body 70 includes a first surface 71 and a second surface 72. The first surface 71 is a surface to which a housing 76, which will be described later, is attached, in other words, a surface with which the housing 76 is in contact. The second surface 72 is an opposite surface from the first surface 71. Note that each of the surfaces of the base body 70 may include a step portion or may include a curved surface portion.

The motor assembly 40 is attached to the base body 70. This motor assembly 40 includes a stator 41 and a rotor 42. The stator 41 is formed with a substantially cylindrical through-hole. The rotor 42 has a substantially cylindrical shape and is arranged in the through-hole of the stator 41 in a freely rotatable manner with respect to the stator 41. The stator 41 and the rotor 42 according to this first embodiment have a brushless-motor structure. However, the stator 41 and the rotor 42 may have a brush-motor structure. In this first embodiment, the stator 41 and the rotor 42 are accommodated in a motor housing 43.

A coil 44 is wound around the stator 41. One end of a feeding terminal 47 is connected to the coil 44. An end 47a as the other end of the feeding terminal 47 is connected to the control board 51. In other words, the end 47a as the end on a side of the feeding terminal 47, which is not connected to the coil 44, is connected to the control board 51. That is, the feeding terminal 47 is connected to the coil 44 and the control board 51, and is used when electric power is supplied from the control board 51 to the coil 44. When the electric power is supplied from the control board 51 to the coil 44 via the feeding terminal 47, a current through the coil 44 is generated, and consequently, a magnetic field is generated. This magnetic field acts on the rotor 42, and the rotor 42 thereby rotates about a rotation axis 42a.

An output shaft 45 is attached to the rotor 42. A center axis of the output shaft 45 is coaxially arranged with the rotation axis 42a. An eccentric body 46 that rotates with this output shaft 45 is attached to one end of the output shaft 45. When the eccentric body 46 rotates, a plunger of the pump device 31, which is pressed against an outer circumferential surface of the eccentric body 46, reciprocates. In this way, the brake fluid is delivered from a suction side to a discharge side of the pump device 31. Note that the motor assembly 40 may have a configuration other than the above-described configuration. For example, the motor assembly 40 may have plural gears such as planetary gears, and may connect the output shaft 45 and the eccentric body 46 via these gears. In addition, for example, the motor assembly 40 may include a cover, which covers components of the motor assembly 40, on the outside of the motor housing 43.

As described above, the motor assembly 40 is attached to the base body 70. In this first embodiment, the motor assembly 40 is attached to the base body 70 as will be described below. More specifically, the base body 70 is formed with a bottomed motor hole 73 that is opened to the first surface 71. In addition, an inner circumferential surface of the motor hole 73 is formed with a step 74 that moves a position of the inner circumferential surface of the motor hole 73 in a direction away from an outer circumferential surface of the motor assembly 40. For example, the steps 74 are arranged on the inner circumferential surface of the motor hole 73 at 90° intervals.

In a state where the end of the output shaft 45 on the side, to which the eccentric body 46 is attached, is located on a deep side of the motor hole 73, the motor assembly 40 is inserted in the motor hole 73. A flange 48 is formed on the outer circumferential surface of the motor assembly 40. In addition, a seat 75 is formed on a deep side of the step 74 in the motor hole 73. The motor assembly 40 is inserted until the flange 48 abuts the seat 75, and is then vertically provided. In such a state, a jig is inserted in a space on the first surface 71 side of the step 74 in the motor hole 73, and the step 74 is pressurized and deformed. In this way, the flange 48 is fixed to the motor hole 73. Note that this attachment configuration of the motor assembly 40 to the base body 70 is merely one example. The motor assembly 40 may be attached to the base body 70 by a different configuration from such a configuration. In addition, for example, the motor assembly 40 may be attached to the housing 76, which will be described below.

As described above, the housing 76 is attached to the first surface 71 of the base body 70. Then, as illustrated in FIG. 3, in a state where the base body 70 and the housing 76 are fixed, the motor assembly 40 is arranged in a space that is surrounded by the base body 70 and the housing 76. In this housing 76, the control board 51 is accommodated. In addition, as illustrated in FIG. 3, in the state where the base body 70 and the housing 76 are fixed, the control board 51 is arranged in a rotation axis 42a direction of the rotor 42 in a manner to oppose the rotor 42 and the output shaft 45.

By the way, conventionally, in order to detect a rotation angle of the rotor in the motor, in other words, in order to detect a rotation angle of the output shaft attached to the rotor, there is a case where a permanent magnet and a detection sensor detecting a magnetic field generated by the permanent magnet are used. The permanent magnet is attached to a rotating portion of the motor and rotates with the rotor. The detection sensor is arranged at the position opposing the permanent magnet. Since the permanent magnet and the detection sensor are provided just as described, it is possible to detect the rotation angle of the rotor on the basis of a change in the magnetic field detected by the detection sensor.

In order to detect a rotation angle of the rotor 42 in the motor assembly 40, in other words, in order to detect a rotation angle of the output shaft 45 attached to the rotor 42, the brake hydraulic pressure control apparatus 60 according to this first embodiment also includes a permanent magnet 49 and a detection sensor 52 detecting a magnetic field generated by the permanent magnet 49. In this first embodiment, the permanent magnet 49 is attached to the output shaft 45 that rotates with the rotor 42. More specifically, the permanent magnet 49 is attached to the end of the output shaft 45 on the opposite side from the side, to which the eccentric body 46 is attached.

Note that the configuration of the permanent magnet 49 is not particularly limited, and any of various known configurations can be adopted. For example, the permanent magnet 49 according to this first embodiment is configured that N-pole permanent magnets and S-pole permanent magnets are alternately arranged in a ring shape. In addition, the detection sensor 52 is not particularly limited, and a sensor having any of various known configurations can be used as the detection sensor 52. For example, as the detection sensor 52, a sensor using a Hall element, a sensor using a magnetoresistance (MR) element, or the like can be used.

Here, in the conventional brake hydraulic pressure control apparatus, the motor for driving the pump device is attached to the second surface of the base body. That is, in the conventional brake hydraulic pressure control apparatus, the motor is arranged on the opposite side from the housing, in which the control board is accommodated, with the base body being the reference. Thus, in the conventional brake hydraulic pressure control apparatus, the permanent magnet, which is attached to the rotating portion of the motor, is also arranged on the opposite side from the housing, in which the control board is accommodated, with the base body being the reference. Furthermore, in the conventional brake hydraulic pressure control apparatus, the detection sensor, which is arranged at the position opposing the permanent magnet, is also arranged on the opposite side from the housing, in which the control board is accommodated, with the base body being the reference.

That is, in the conventional brake hydraulic pressure control apparatus, the detection sensor is arranged on the opposite side from the control board, which is accommodated in the housing, with the base body being the reference. That is, in the conventional brake hydraulic pressure control apparatus, the detection sensor is mounted on the different control board from the control board accommodated in the housing. As a result, in the conventional brake hydraulic pressure control apparatus, in the case where the permanent magnet and the detection sensor are used to detect the rotation angle of the rotor, the new control board, on which the detection sensor is mounted, is required. Therefore, there is the problem of the increased manufacturing cost of the brake hydraulic pressure control apparatus.

Meanwhile, in the brake hydraulic pressure control apparatus 60 according to this first embodiment, the motor assembly 40 is arranged in the space that is surrounded by the base body 70 and the housing 76. Thus, in the brake hydraulic pressure control apparatus 60 according to this first embodiment, the control board 51 of the controller 50, which controls the motor assembly 40, can be arranged in the rotation axis 42a direction of the rotor 42 in a manner to oppose the permanent magnet 49. As a result, in the brake hydraulic pressure control apparatus 60 according to this first embodiment, the detection sensor 52 can be mounted on the control board 51 that is conventionally provided. Therefore, even in the case where the brake hydraulic pressure control apparatus 60 according to this first embodiment is configured to detect the rotation angle of the rotor 42, it is possible to suppress the increase in the manufacturing cost in comparison with the conventional brake hydraulic pressure control apparatus.

In addition, in this first embodiment, a distance in the rotation axis 42a direction from the end 47a of the feeding terminal 47 to the stator 41 is longer than a distance in the rotation axis 42a direction from an end 49a of the permanent magnet 49 on the side opposing the control board 51 to the stator 41. That is, the end 47a of the feeding terminal 47 is farther from the stator 41 than the end 49a of the permanent magnet 49. With such a configuration, it is possible to improve a degree of freedom in design of the brake hydraulic pressure control apparatus 60. A reason therefor will hereinafter be described with reference to FIG. 3 and FIG. 4, which will be described later.

FIG. 4 is a partial cross-sectional view in which another example of the unitized portion of the brake hydraulic pressure control apparatus according to the first embodiment of the present invention is viewed from the side.

In the case where the end 47a of the feeding terminal 47 is farther from the stator 41 from the end 49a of the permanent magnet 49, as illustrated in FIG. 3 or FIG. 4, the feeding terminal 47 and the control board 51 can be connected to each other. In detail, as illustrated in FIG. 3, the end 47a of the feeding terminal 47 is arranged at the position where the end 47a can contact the control board 51. Since the end 47a of the feeding terminal 47 is arranged, just as described, the feeding terminal 47 and the control board 51 can directly be connected to each other. In addition, as illustrated in FIG. 4, the end 47a of the feeding terminal 47 can be arranged at a position where the end 47a does not contact the control board 51. Since the end 47a of the feeding terminal 47 is arranged, just as described, the feeding terminal 47 and the control board 51 can be connected by a connection terminal 47b. Meanwhile, in the case where the end 47a of the feeding terminal 47 is closer to the stator 41 from the end 49a of the permanent magnet 49, the feeding terminal 47 and the control board 51 can only be connected to each other by using the connection terminal 47b. Just as described, in the case where the end 47a of the feeding terminal 47 is farther from the stator 41 than the end 49a of the permanent magnet 49, the degree of freedom in the design of the brake hydraulic pressure control apparatus 60 is improved.

<Effects of Brake Hydraulic Pressure Control Apparatus>

A description will be made on effects of the brake hydraulic pressure control apparatus 60 according to this first embodiment.

The brake hydraulic pressure control apparatus 60 according to this first embodiment includes: the base body 70 formed with the channels of the brake fluid; the motor assembly 40 including the rotor 42 and the stator 41 and driving the pump device 31 provided in the channel of the brake fluid; the control board 51 of the controller 50 controlling the motor assembly 40; and the housing 76 accommodating the control board 51. In the brake hydraulic pressure control apparatus 60 according to this first embodiment further includes: the permanent magnet 49 attached to the motor assembly 40 and rotating with the rotor 42; and the detection sensor 52 detecting the magnetic field generated by the permanent magnet 49. The motor assembly 40 is arranged in the space that is surrounded by the base body 70 and the housing 76. The control board 51 is arranged in the rotation axis 42a direction of the rotor 42 in the manner to oppose the permanent magnet 49. In addition, the detection sensor 52 is mounted on the control board 51. In the brake hydraulic pressure control apparatus 60, which is configured just as described, according to this first embodiment, the detection sensor 52 is mounted on the control board 51, which is conventionally provided. Thus, even in the case where the brake hydraulic pressure control apparatus 60 is configured to detect the rotation angle of the rotor 42, it is possible to suppress the increase in the manufacturing cost in comparison with the conventional brake hydraulic pressure control apparatus.

Preferably, the distance in the rotation axis 42a direction from the end 47a of the feeding terminal 47 to the stator 41 is longer than the distance in the rotation axis 42a direction from the end 49a of the permanent magnet 49 to the stator 41. With such a configuration, it is possible to improve the degree of freedom in the design of the brake hydraulic pressure control apparatus 60.

Second Embodiment

In the case where the position of the detection sensor 52 with respect to the permanent magnet 49 deviates from the position in design, accuracy in the detection of the angle of the rotor 42 worsens. To handle such a problem, for example, the brake hydraulic pressure control apparatus 60 may be provided with a positioning mechanism 80 as will be described below, and the permanent magnet 49 and the detection sensor 52 may be positioned by the positioning mechanism 80. It is assumed that matters not described in this second embodiment are similar to those in the first embodiment.

FIG. 5 is a partial cross-sectional view in which a unitized portion of a brake hydraulic pressure control apparatus according to the second embodiment of the present invention is viewed from the side.

A brake hydraulic pressure control apparatus 60 according to this second embodiment includes the positioning mechanism 80. The positioning mechanism 80 positions the motor assembly 40 and the control board 51. That is, the positioning mechanism 80 positions the permanent magnet 49, which is provided in the motor assembly 40, and the detection sensor 52, which is mounted on the control board 51. In this second embodiment, a first positioning section 81 is provided as the positioning mechanism 80. The first positioning section 81 is held between the motor assembly 40 and the control board 51. More specifically, the first positioning section 81 is held between a non-rotating portion of the motor assembly 40 and the control board 51. For example, in this second embodiment, the first positioning section 81 is held between the motor housing 43 of the motor assembly 40 and the control board 51.

In this way, of the positions of the control board 51 with respect to the motor assembly 40, the position thereof in the rotation axis 42a direction can be restricted. That is, of the positions of the detection sensor 52 with respect to the permanent magnet 49, the position thereof in the rotation axis 42a direction can be restricted. Thus, due to the provision of the first positioning section 81, it is possible to suppress the distance between the permanent magnet 49 and the detection sensor 52 in the rotation axis 42a direction from being significantly deviated from a design value. Therefore, it is possible to suppress worsening of the accuracy in the detection of the angle of the rotor 42.

In this second embodiment, the first positioning section 81 is constructed of plural columnar members. However, the shape and the number of the member constituting the first positioning section 81 are not limited thereto. For example, the first positioning section 81 may be constructed of a single hollow columnar member. In addition, in a state before being held between the motor assembly 40 and the control board 51, the first positioning section 81 may be fixed to the motor assembly 40 or the control board 51. Furthermore, the first positioning section 81 and the motor assembly 40 may be fixed to each other by integrally forming components of the first positioning section 81 and the motor assembly 40 (for example, the motor housing 43).

Third Embodiment

The positioning mechanism 80 may be configured as in this third embodiment. It is assumed that matters not described in this third embodiment are similar to those in the first embodiment or the second embodiment.

FIG. 6 is a partial cross-sectional view in which a unitized portion of a brake hydraulic pressure control apparatus according to the third embodiment of the present invention is viewed from the side.

In this third embodiment, a second positioning section 82 is provided as the positioning mechanism 80. Of the positions of the control board 51 with respect to the motor assembly 40, the second positioning section 82 restricts the positions of the control board 51 in a perpendicular direction to the rotation axis 42a direction. That is, in FIG. 6, of the positions of the control board 51 with respect to the motor assembly 40, the second positioning section 82 restricts the positions thereof in a lateral direction of the sheet and an orthogonal direction of the sheet.

The second positioning section 82 includes a concave section 83 and a convex section 84. The concave section 83 is provided in the control board 51 and is recessed in the rotation axis 42a direction. The convex section 84 is provided in the motor assembly 40 and is inserted in the concave section 83 in the rotation axis 42a direction. More specifically, the convex section 84 is provided in the non-rotating portion (the motor housing 43 or the like) of the motor assembly 40.

A cross-sectional shape of the convex section 84 in the perpendicular direction to the rotation axis 42a is a shape that corresponds to a cross-sectional shape of the concave section 83 in the perpendicular direction to the rotation axis 42a. For example, in this third embodiment, the cross-sectional shape of the convex section 84 in the perpendicular direction to the rotation axis 42a and the cross-sectional shape of the concave section 83 in the perpendicular direction to the rotation axis 42a are circular shapes. In such a case, when the single convex section 84 and the single concave section 83 are only provided, the control board 51 rotates with the convex section 84 being a reference. Accordingly, it is impossible to restrict the positions of the control board 51 in the perpendicular direction to the rotation axis 42a direction with respect to the motor assembly 40. For this reason, the second positioning section 82 according to this third embodiment includes two or more of the convex sections 84 and two or more of the concave sections 83. In this way, it is possible to restrict the rotation of the control board 51 with the convex section 84 being the reference, and it is also possible to restrict the positions of the control board 51 in the perpendicular direction to the rotation axis 42a direction with respect to the motor assembly 40. Thus, it is possible to suppress the positions of the detection sensor 52 in the perpendicular direction to the rotation axis 42a direction with respect to the permanent magnet 49 from being significantly deviated from design values. Therefore, it is possible to suppress worsening of the accuracy in the detection of the angle of the rotor 42.

The cross-sectional shape of each of the convex section 84 and the concave section 83 can be any shape, and the number of each of the convex section 84 and the concave section 83 can be any number. For example, the cross-sectional shape of the convex section 84 in the perpendicular direction to the rotation axis 42a and the cross-sectional shape of the concave section 83 in the perpendicular direction to the rotation axis 42a may be shapes other than the circular shapes (oval shapes, long round shapes, polygonal shapes, or the like). In the case of such shapes, only with the single convex section 84 and the single concave section 83, it is possible to restrict the rotation of the control board 51 with the convex section 84 being the reference, and it is also possible to restrict the positions of the control board 51 in the perpendicular direction to the rotation axis 42a direction with respect to the motor assembly 40.

In addition, the members in which the concave section 83 and the convex section 84 are not limited to the members illustrated in FIG. 6.

FIG. 7 is a partial cross-sectional view in which another example of the unitized portion of the brake hydraulic pressure control apparatus according to the third embodiment of the present invention is viewed from the side.

As illustrated in FIG. 7, the concave section 83 may be provided in the motor assembly 40. In addition, as illustrated in FIG. 7, the convex section 84 may be provided in the control board 51. That is, one of the concave section 83 and the convex section 84 only has to be provided in the motor assembly 40, and the other of the concave section 83 and the convex section 84 may be provided in the control board 51.

Fourth Embodiment

It is needless to say that the positioning mechanism 80 can include both of the first positioning section 81 and the second positioning section 82. At this time, in the case where the first positioning section 81 is fixed to the motor assembly 40 or the control board 51, the concave section 83 or the convex section 84 may be provided in the first positioning section 81. Note that matters not described in this fourth embodiment are similar to those in any of the first embodiment to the third embodiment.

FIG. 8 is a partial cross-sectional view in which one example of a unitized portion of a brake hydraulic pressure control apparatus according to the fourth embodiment of the present invention is viewed from the side.

In the brake hydraulic pressure control apparatus 60 illustrated in FIG. 8, in the state before being held between the motor assembly 40 and the control board 51, the first positioning section 81 is fixed to the motor assembly 40. The convex section 84 of the second positioning section 82 is provided in the first positioning section 81. The concave section 83 of the second positioning section 82 is provided in the control board 51. That is, the convex section 84 is indirectly provided in the motor assembly 40 via the first positioning section 81. Since the convex section 84 is provided in the first positioning section 81, it is possible to reduce an installment space of the positioning mechanism 80. Thus, it is possible to improve the degree of freedom in the design of the brake hydraulic pressure control apparatus 60. The concave section 83 may be provided in the first positioning section 81, and the convex section 84 may be provided in the control board 51. Also, with such a configuration, it is possible to reduce the installment space of the positioning mechanism 80. Thus, it is possible to improve the degree of freedom in the design of the brake hydraulic pressure control apparatus 60.

FIG. 9 is a partial cross-sectional view in which another example of the unitized portion of the brake hydraulic pressure control apparatus according to the fourth embodiment of the present invention is viewed from the side.

In the brake hydraulic pressure control apparatus 60 illustrated in FIG. 9, in the state before being held between the motor assembly 40 and the control board 51, the first positioning section 81 is fixed to the control board 51. The convex section 84 of the second positioning section 82 is provided in the first positioning section 81. The concave section 83 of the second positioning section 82 is provided in the motor assembly 40. That is, the convex section 84 is indirectly provided in the control board 51 via the first positioning section 81. Since the convex section 84 is provided in the first positioning section 81, it is possible to reduce the installment space of the positioning mechanism 80. Thus, it is possible to improve the degree of freedom in the design of the brake hydraulic pressure control apparatus 60. The concave section 83 may be provided in the first positioning section 81, and the convex section 84 may be provided in the motor assembly 40. Also, with such a configuration, it is possible to reduce the installment space of the positioning mechanism 80. Thus, it is possible to improve the degree of freedom in the design of the brake hydraulic pressure control apparatus 60.

Fifth Embodiment

In a brake hydraulic pressure control apparatus 60 according to this fifth embodiment, the positioning mechanism 80 is constructed of an electric conductor. Conventionally, there is a case where the control board 51 and the motor assembly 40 are connected by a ground connection wire as a countermeasure against noise. Since the positioning mechanism 80 is constructed of the electric conductor, the positioning mechanism 80 can function as the ground connection wire. Therefore, when the positioning mechanism 80 is constructed of the electric conductor, it is possible to reduce the manufacturing cost of the brake hydraulic pressure control apparatus 60.

The description has been made so far on the example of the brake hydraulic pressure control apparatus according to the present invention in each of the embodiments. However, the brake hydraulic pressure control apparatus according to the present invention is not limited to the description of each of the embodiments. For example, all or parts of the embodiments may be combined to constitute the brake hydraulic pressure control apparatus according to the present invention.

REFERENCE SIGNS LIST

1: Trunk
2: Handlebar
3: Front wheel
3a: Rotor
4: Rear wheel
4a: Rotor
10: Brake system
11: Brake lever
12: First hydraulic circuit
13: Brake pedal
14: Second hydraulic circuit
21: Master cylinder
22: Reservoir
23: Brake caliper
24: Wheel cylinder
25: Primary channel
25a: Primary channel intermediate portion
26: Secondary channel
26a: Secondary channel intermediate portion
27: Booster channel
28: Inlet valve
29: Outlet valve
30: Accumulator
31: Pump device
32: Switching valve
33: Booster valve
34: Master cylinder hydraulic pressure sensor
35: Wheel cylinder hydraulic pressure sensor
40: Motor assembly
41: Stator
42: Rotor
42a: Rotation axis
43: Motor housing
44: Coil
45: Output shaft
46: Eccentric body
47: Feeding terminal
47a: End
47b: Connection terminal
48: Flange
49: Permanent magnet
49a: End
50: Controller
51: Control board
52: Detection sensor
60: Brake hydraulic pressure control apparatus
70: Base body
71: First surface
72: Second surface
73: Motor hole
74: Step
75: Seat
76: Housing
80: Positioning mechanism
81: First positioning section
82: Second positioning section
83: Concave section
84: Convex section
100: Vehicle
MP: Master cylinder port
WP: Wheel cylinder port

The invention claimed is:

1. A brake hydraulic pressure control apparatus (60) for a vehicle (100), the brake hydraulic pressure control apparatus (60) comprising:
a base body (70) formed with a channel (26) of a brake fluid;
a motor assembly (40) that includes a rotor (42) and a stator (41) accommodated in a motor housing (43), the motor assembly (40) configured to drive a pump device (31) provided in the channel (26);
a control board (51) of a controller (50) that controls the motor assembly (40);
a housing (76) that accommodates the control board (51);
a permanent magnet (49) that is attached to the motor assembly (40) and rotates with the rotor (42);
a coil (44) that is wound around the stator (41);
a feeding terminal (47) that is connected to the coil (44) and the control board (51) and is used when being supplied with electric power from the control board (51);
a positioning mechanism (80) that extends between and contacts the motor assembly (40) and the control board (51) to position the motor assembly (40) and the control board (51), the positioning mechanism (80) located adjacent to the feeding terminal and the coil in a direction perpendicular to a rotation axis (42a) direction of the rotor (42); and
a detection sensor (52) that detects a magnetic field generated by the permanent magnet (49), wherein
the motor assembly (40) is arranged in a space that is surrounded by the base body (70) and the housing (76),
the control board (51) is arranged in the rotation axis (42a) direction of the rotor (42) in a manner to oppose the permanent magnet (49), and
the detection sensor (52) is mounted on the control board (51).

2. The brake hydraulic pressure control apparatus (60) according to claim 1, wherein
the positioning mechanism (80) includes a first positioning section (81) that is held between the motor assembly (40) and the control board (51) and restricts a position of the control board (51) in the rotation axis (42a) direction of positions of the control board (51) with respect to the motor assembly (40).

3. The brake hydraulic pressure control apparatus (60) according to claim 1, wherein
the positioning mechanism (80) includes a second positioning section (82) that restricts positions of the control board (51) in a perpendicular direction to the rotation axis (42a) direction of positions of the control board (51) with respect to the motor assembly (40), the second positioning section (82) includes:
- a concave section (83) that is recessed in the rotation axis (42a) direction; and
- a convex section (84) that is inserted in the concave section (83) in the rotation axis (42a) direction, one of the concave section (83) and the convex section (84) is provided in the motor assembly (40), and the other of the concave section (83) and the convex section (84) is provided in the control board (51).

4. The brake hydraulic pressure control apparatus (60) according to claim 1, wherein
the positioning mechanism (80) is an electric conductor.

5. The brake hydraulic pressure control apparatus (60) according to claim 1, wherein
one end of the feeding terminal (47) is connected to the coil (44), and
a distance in the rotation axis (42a) direction from an end (47a) of the feeding terminal (47), which is not connected to the coil (44), to the stator (41) is longer than a distance in the rotation axis (42a) direction from an end (49a) of the permanent magnet (49), which is on a side opposing the control board (51), to the stator (41).

6. The brake hydraulic pressure control apparatus (60) according to claim 2, wherein
the positioning mechanism (80) includes a second positioning section (82) that restricts positions of the control board (51) in a perpendicular direction to the rotation axis (42a) direction of positions of the control board (51) with respect to the motor assembly (40),
the second positioning section (82) includes:
- a concave section (83) that is recessed in the rotation axis (42a) direction; and
- a convex section (84) that is inserted in the concave section (83) in the rotation axis (42a) direction, one of the concave section (83) and the convex section (84) is provided in the motor assembly (40), and the other of the concave section (83) and the convex section (84) is provided in the control board (51).

7. The brake hydraulic pressure control apparatus (60) according to claim 6, wherein
the positioning mechanism (80) is an electric conductor.

8. The brake hydraulic pressure control apparatus (60) according to claim 7, wherein
one end of the feeding terminal (47) is connected to the coil (44), and
a distance in the rotation axis (42a) direction from an end (47a) of the feeding terminal (47), which is not connected to the coil (44), to the stator (41) is longer than a distance in the rotation axis (42a) direction from an end (49a) of the permanent magnet (49), which is on a side opposing the control board (51), to the stator (41).

* * * * *